H. H. SCHMITT.
SHOCK ABSORBER.
APPLICATION FILED MAR. 4, 1912.
1,031,381.
Patented July 2, 1912.
2 SHEETS—SHEET 1.
Fig. 2.
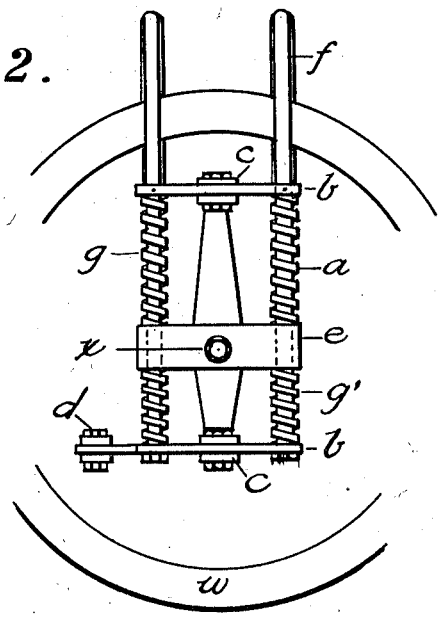
Fig. 3.
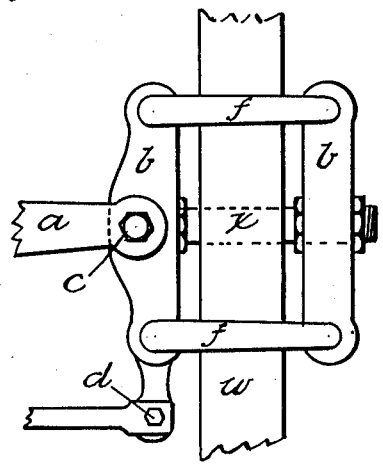
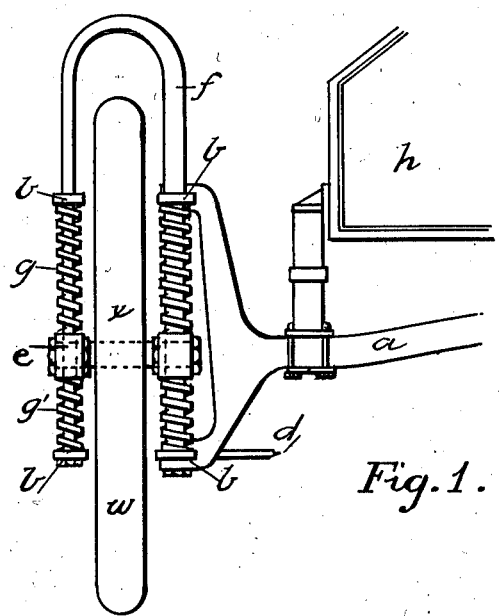
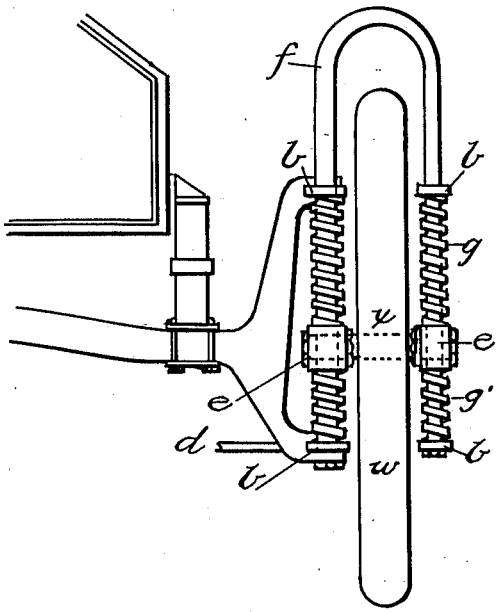
Fig. 1.
Witnesses.
H. L. Burn
Y. D. Tensill
Inventor.
Herman H. Schmitt
Walter B. Jones. attorney.

H. H. SCHMITT.
SHOCK ABSORBER.
APPLICATION FILED MAR. 4, 1912.

1,031,381.

Patented July 2, 1912.

2 SHEETS—SHEET 2.

WITNESSES

INVENTOR
Herman H Schmitt
BY
Walter B Jones ATTORNEY

UNITED STATES PATENT OFFICE.

HERMAN H. SCHMITT, OF CRESWELL, OREGON.

SHOCK-ABSORBER.

1,031,381.  Specification of Letters Patent.  Patented July 2, 1912.

Application filed March 4, 1912. Serial No. 681,383.

*To all whom it may concern:*

Be it known that I, HERMAN H. SCHMITT, a citizen of the United States, residing at Creswell, in the county of Lane and State of Oregon, have invented new and useful Improvements in Shock-Absorbers, of which the following is a specification.

This invention relates to certain new and useful improvements in shock absorbers and has for its object a device of this type of novel and simple form which will absorb the shocks and jars which may be given the vehicle, and further to generally increase the efficiency and practicability of devices of this character.

Figure 6:
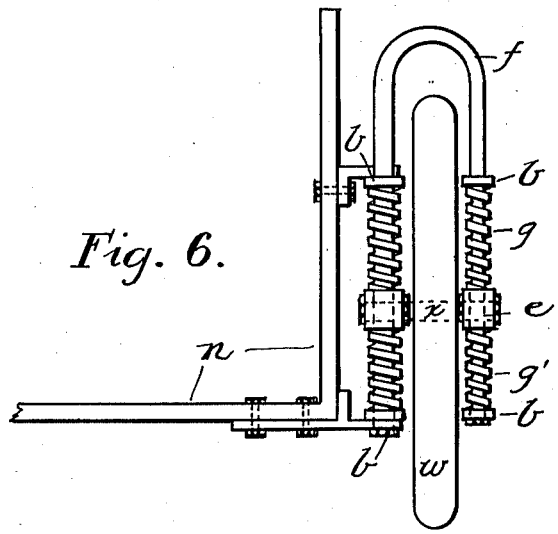
Figure 4:
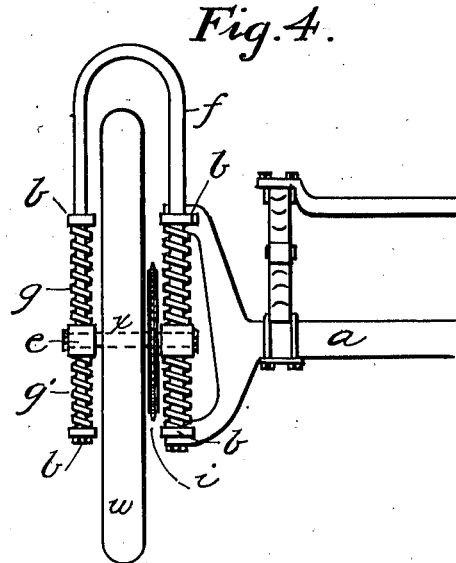
Figure 5:
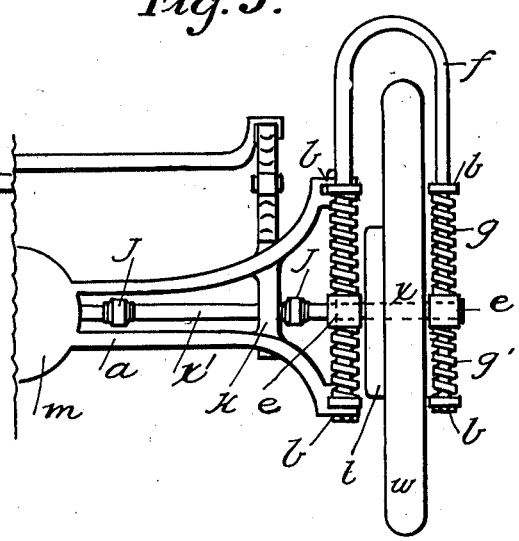

In the drawings: Figure 1 is a front elevation of a vehicle equipped with the present invention; Fig. 2 is a side elevation of one of the wheels with the present invention applied thereto; Fig. 3 is a fragmentary top plan view of Fig. 3; Fig. 4 is a rear elevation of the invention applied to a wheel of the rear axle of a chain driven vehicle; Fig. 5 is a similar view showing the invention applied to one of the wheels of a shaft driven vehicle; and Fig. 6 is a similar view of the invention applied to a truck.

The front axle $a$ is forked at its ends and to each of the ends of the forks thereof horizontal cross bars $b$ are secured by means of nuts $c$. A pair of inverted U-shaped arms $f$ are employed for each wheel, the arms receiving the wheels in the spaces between the legs thereof, the legs extending through openings provided therefor in the cross bars $b$, the end portions of the cross bars being rigidly secured to the legs of the arms. A similar pair of cross bars $b$ are affixed to the outer legs of the pair of arms $f$ and are located in the same planes as the cross bars $b$ that are carried by the forked ends of the axle $a$.

Slidingly arranged on both the inner and outer legs of each pair of U-shaped arms are the horizontal cross heads $e$ which latter are perforated to receive the legs of the arms $f$ and have the ends of the spindles $x$ of the wheels $w$ secured thereto. Between the under faces of the cross heads $e$ and the upper faces of the lower cross bars $b$, are arranged short coil springs $g'$ which encircle the legs of the arms $f$. Long coil springs $g$ are arranged between the upper faces of the cross heads and the under faces of the upper cross bars $b$.

In Fig. 2 the bottom cross bar is shown extended and connected to the steering means shown in fragment at $d$.

In Fig. 4 the spindle $x$ of one of the rear wheels has a sprocket $i$ secured thereto, to engage with the chain drive.

In Fig. 5 the shaft $x$ which is driven from the differential contained in casing $m$, is provided with a pair of universal joints $j, j$, which allow the spindle to move vertically and the axle $x'$ to have similar movement through the part $k$ that is connected to the forked end of the axle $a$. A brake drum $l$ is secured to the spindle $x$ and is located between the legs of the arm $f$.

In Fig. 6, $n$ designates the body of a low truck or similar vehicle, which is connected to the cross bars of the inner legs of the arms $f$, as therein shown.

What is claimed is:

1. In combination with an axle having a forked end, a pair of horizontal cross bars centrally secured to the ends of the fork of the axle, a pair of inverted U-shaped arms which straddle the wheel, said arms having their inner legs extending through the cross bars and being rigidly connected thereto, an upper and a lower cross bar disposed in the same plane as the respective first named cross bars which are perforated to receive the outer legs of the arms and are rigidly secured thereto, a sliding cross head mounted on the inner legs of the arms, a sliding cross head mounted on the outer legs of the arms, and two pairs of springs for each leg of the arms, said springs being disposed between the opposite faces of the cross heads and the cross bars, and a spindle for carrying the wheel having its ends secured to said cross heads.

2. In combination with a wheeled axle, a pair of inverted U-shaped arms which straddle the wheel, means connecting the inner legs of the arms with the axle, means to connect the outer legs of the arms, a cross head slidingly mounted on the inner legs of the arms, and a cross head slidingly mounted on the outer legs of the arms whereby the cross heads extend on opposite sides of the wheel, a spindle connected at its ends to the cross heads to receive the wheel, and springs encircling the legs of the arms and bearing against opposite sides of the cross head.

3. In combination with an axle, and a wheel, a pair of inverted U-shaped arms which are connected to and supported by the axle, said arms straddling the wheel so that the legs of the arms extend on opposite sides of the wheel, a pair of cross heads slidingly mounted on the legs of the arms and disposed on opposite sides of the wheel, a spindle supporting the wheel and connected to the cross heads, and springs engaging on opposite sides of each end of each cross head.

4. In combination with an axle and a wheel, an inverted U-shaped arm connected to and supported by the end of the axle and disposed to have its legs extend on opposite sides of the wheel, a sliding member on each leg of the arm, a spindle carrying the wheel and connected to said members, and springs engaging above and below each of said sliding members.

In testimony whereof I have hereunto set my hand in presence of two subscribing witnesses.

HERMAN H. SCHMITT.

Witnesses:
H. L. Bown,
Y. D. Hensill.